(12) United States Patent
Losasso Petterson (10) Patent No.: US 8,725,476 B1
(45) Date of Patent: May 13, 2014

(54) APPLYING DETAILS IN A SIMULATION

(75) Inventor: Frank Losasso Petterson, Redwood City, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 354 days.

(21) Appl. No.: 12/773,189

(22) Filed: May 4, 2010

(51) Int. Cl.
*G06F 17/50* (2006.01)
*G06F 7/60* (2006.01)
*G06F 9/455* (2006.01)

(52) U.S. Cl.
USPC ............... 703/9; 703/1; 703/2; 703/6; 703/7

(58) Field of Classification Search
CPC ..... G06F 9/455; G06F 9/5077; G06F 13/105; G06F 13/106; G06F 13/107; G06F 11/261; G06F 17/50; G06T 7/00; G06T 17/00
USPC ............................................................. 703/9
See application file for complete search history.

(56) References Cited

U.S. PATENT DOCUMENTS

| | | | | |
|---|---|---|---|---|
| 5,325,472 A | * | 6/1994 | Horiuchi et al. ............ | 345/427 |
| 5,325,480 A | * | 6/1994 | Rice ............................ | 345/474 |
| 5,347,621 A | * | 9/1994 | Yutaka ........................ | 345/593 |
| 5,475,507 A | * | 12/1995 | Suzuki et al. ................ | 358/500 |
| 5,537,641 A | * | 7/1996 | da Vitoria Lobo et al. ... | 345/419 |
| 5,630,718 A | * | 5/1997 | Montag et al. .................. | 434/2 |
| 5,877,777 A | * | 3/1999 | Colwell ....................... | 345/473 |
| 5,920,492 A | * | 7/1999 | Montag et al. .................. | 703/6 |
| 5,923,330 A | * | 7/1999 | Tarlton et al. ............... | 345/419 |
| 5,966,129 A | * | 10/1999 | Matsukuma et al. ......... | 345/418 |
| 6,030,289 A | * | 2/2000 | Nomi et al. .................... | 463/32 |
| 6,052,131 A | * | 4/2000 | Oka ............................. | 345/441 |
| 6,057,847 A | * | 5/2000 | Jenkins ....................... | 345/422 |
| 6,100,893 A | * | 8/2000 | Ensz et al. ................... | 345/420 |
| 6,121,977 A | * | 9/2000 | Arai et al. .................... | 345/619 |
| 6,154,576 A | * | 11/2000 | Anderson et al. ............ | 382/269 |
| 6,198,489 B1 | * | 3/2001 | Salesin et al. ................ | 715/784 |
| 6,266,071 B1 | * | 7/2001 | Stam et al. ................... | 345/473 |
| 6,405,151 B1 | * | 6/2002 | Fujii et al. .................... | 702/155 |
| 6,485,369 B2 | * | 11/2002 | Kondo et al. .................. | 463/43 |
| 6,500,008 B1 | * | 12/2002 | Ebersole et al. ............. | 434/226 |
| 6,504,569 B1 | * | 1/2003 | Jasinschi et al. ............. | 348/43 |
| 6,512,999 B1 | * | 1/2003 | Dimas et al. .................. | 703/9 |
| 6,583,787 B1 | * | 6/2003 | Pfister et al. ................. | 345/441 |
| 6,664,961 B2 | * | 12/2003 | Ray et al. ..................... | 345/424 |
| 6,680,735 B1 | * | 1/2004 | Seiler et al. .................. | 345/424 |
| 6,731,278 B2 | * | 5/2004 | Yokoyama et al. .......... | 345/419 |

(Continued)

OTHER PUBLICATIONS

Johanson, Claes. "Real-Time Water Rendering: Introducing the Projected Grid Concept", Mar. 2004.*

(Continued)

*Primary Examiner* — Shambhavi Patel
(74) *Attorney, Agent, or Firm* — Kilpatrick Townsend & Stockton LLP (57) ABSTRACT

A computer-implemented method for applying details in a simulation includes obtaining first data corresponding to a first simulation of matter in a space domain. The method includes performing, using the first data, a second simulation of the matter producing second data representing details for the first simulation, the second data distributed in the space domain using a grid where each cell has a common depth-to-size ratio from a camera perspective. The method includes rendering an image of the matter, wherein the second data is obtained from the grid and used in the rendering.

22 Claims, 4 Drawing Sheets

(56) References Cited

U.S. PATENT DOCUMENTS

| | | | |
|---|---|---|---|
| 6,828,962 B1* | 12/2004 | McConkie et al. | 345/419 |
| 6,879,324 B1* | 4/2005 | Hoppe | 345/423 |
| 7,090,577 B2* | 8/2006 | Serizawa et al. | 463/6 |
| 7,102,652 B2* | 9/2006 | O'Donnell et al. | 345/629 |
| 7,471,291 B2* | 12/2008 | Kaufman et al. | 345/424 |
| 7,472,046 B2* | 12/2008 | Rasmussen et al. | 703/6 |
| 7,525,542 B2* | 4/2009 | Stevenson et al. | 345/422 |
| 7,539,606 B2* | 5/2009 | Comair et al. | 703/9 |
| 7,647,216 B2* | 1/2010 | Bermejo Alvarez et al. | 703/7 |
| 7,706,636 B2* | 4/2010 | Higashino et al. | 382/302 |
| 7,747,420 B1* | 6/2010 | Rasmussen et al. | 703/6 |
| 7,876,971 B2* | 1/2011 | Gardella et al. | 382/254 |
| 7,983,477 B2* | 7/2011 | Holliman | 382/154 |
| RE42,638 E * | 8/2011 | Ray et al. | 345/424 |
| 8,179,424 B2* | 5/2012 | Moller | 348/46 |
| 8,218,211 B2* | 7/2012 | Kroll et al. | 359/9 |
| 8,224,107 B2* | 7/2012 | Gardella et al. | 382/254 |
| 8,289,327 B1* | 10/2012 | Horvath | 345/428 |
| 8,314,789 B2* | 11/2012 | Fitzmaurice et al. | 345/419 |
| 8,335,675 B1* | 12/2012 | DiVerdi et al. | 703/9 |
| 8,401,225 B2* | 3/2013 | Newcombe et al. | 382/100 |
| 8,587,583 B2* | 11/2013 | Newcombe et al. | 345/420 |
| 2001/0040586 A1* | 11/2001 | Yokoyama et al. | 345/672 |
| 2002/0050988 A1* | 5/2002 | Petrov et al. | 345/418 |
| 2002/0060682 A1* | 5/2002 | Kohira et al. | 345/473 |
| 2002/0095276 A1* | 7/2002 | Rong et al. | 703/2 |
| 2002/0113787 A1* | 8/2002 | Ray et al. | 345/424 |
| 2002/0149599 A1* | 10/2002 | Dwyer et al. | 345/592 |
| 2002/0149626 A1* | 10/2002 | Ozcelik et al. | 345/781 |
| 2002/0169013 A1* | 11/2002 | Serizawa et al. | 463/6 |
| 2003/0001843 A1* | 1/2003 | Suzuki et al. | 345/426 |
| 2003/0011596 A1* | 1/2003 | Zhang et al. | 345/426 |
| 2003/0017438 A1* | 1/2003 | Ebersole et al. | 434/226 |
| 2003/0035917 A1* | 2/2003 | Hyman | 428/67 |
| 2003/0038800 A1* | 2/2003 | Kawahara | 345/420 |
| 2003/0195735 A1* | 10/2003 | Rosedale et al. | 703/13 |
| 2004/0227992 A1* | 11/2004 | Putilin et al. | 359/462 |
| 2004/0257375 A1* | 12/2004 | Cowperthwaite | 345/582 |
| 2005/0116949 A1* | 6/2005 | Hoppe | 345/423 |
| 2005/0213820 A1* | 9/2005 | Liu et al. | 382/190 |
| 2005/0240384 A1* | 10/2005 | Houston et al. | 703/9 |
| 2005/0253854 A1* | 11/2005 | Lischinski et al. | 345/474 |
| 2007/0239414 A1* | 10/2007 | Song et al. | 703/9 |
| 2009/0070079 A1* | 3/2009 | Harada | 703/2 |
| 2012/0162204 A1* | 6/2012 | Vesely et al. | 345/419 |
| 2012/0236001 A1* | 9/2012 | Mejdrich et al. | 345/426 |
| 2013/0112407 A1* | 5/2013 | Cheng et al. | 166/250.15 |

OTHER PUBLICATIONS

Losasso et al. "Simulating Water and Smoke with an Octree Data Structure", 2004.*
Woo, Alan. "Realistic Smoke Simulation using a Frustum Aligned Grid", 2006.*
Horvath et al. "Directable, High-Resolution Simulation of Fire on the GPU", ACM 2009.*
Lee et al. "An Efficient Algorithm for Rendering Large Bodies of Water", 2006.*
Velikovich et al. "Adapting the Lattice-Boltzmann Model for Efficient Airflow Modeling inside the View Frustum", 2003.*
Tatarchuk et al ."The Importance of Being Noisy: Fast, High Quality Noise", 2007.*
Johanson et al. "Real-time water rendering Introducing the projected grid concept", 2004.*
Guthe et al. "Real-Time Out-of-Core Rendering", 2004.*
Yu et al. "Scalable real-time animation of rivers", Eurographics 2009.*
Foster et al. "Controlling Fluid Animation", 2001.*
Keiser, Richard. "Meshless Lagrangian Methods for Physics-Based Animations of Solids and Fluids", 2006.*
Bongart, Robert. "Efficient Simulation of Fluid Dynamics in a 3D Game Engine", 2007.*
Dommermuth et al. "The numerical simulation of ship waves using cartesian grid methods with adaptive mesh refinement", 25th Symposium on Naval Hydrodynamics, Aug. 8-13, 2004.*
Barran, Brian. "View Dependent Fluid Dynamics", 2006.*
Bridson et al. "Fluid Simulation SIGGRAPH 2007 Course Notes", 2007.*
Zhao et al. "Flow Simulation with Locally-Refined LBM", 2007.*
Chentanez, et al. "Liquid Simulation on Lattice-Based Tetrahedral Meshes" ACM Siggraph Symposium on Computer Animation, Aug. 2007, 10 pages.
Kim, et al. "Wavelet Turbulence for Fluid Simulation", Proceedings of ACM SIGGRAPH 2008, vol. 27, Issue 3, Aug. 2008, 6 pages.
Losasso, et al. "Simulating Water and Smoke with an Octree Data Structure", Proceedings of ACM SIGGRAPH 2004, vol. 23, Issue 3, Aug. 2004, 6 pages.
Nikitin, et al. "Numerical Simulations of Free Surface Flows on Adaptive Cartesian Grids with the Level Set Function Method" 2010 , downloaded from the Internet at: www.mathes.emory.edu/~molshan/ftp/pub/FS_VP.pdf on Jul. 21, 2011, 19 pages.
Selle, et al. "A Vortex Particle Method for Smoke, Water and Explosions", ACM SIGGRAPH 2005, vol. 24, Issue 3, Jul. 2005, 5 pages.

* cited by examiner

APPLYING DETAILS IN A SIMULATION

TECHNICAL FIELD

This document relates to applying details in a simulation.

BACKGROUND

Simulation is an area of computer graphics that places high demands on the ability to generate lifelike images, sometimes as close to an actual photograph as possible, and also to be able to do so as quickly as possible or using the least amount of system resources. A particular challenge in simulation is to generate a plausible appearance—and in animated sequences, behavior—of fluid materials, for example smoke or water, taking into account practical limits for how much system resources can be used and how rapidly the simulation should be generated.

SUMMARY

In a first aspect, a computer-implemented method for applying details in a simulation includes obtaining first data corresponding to a first simulation of matter in a space domain. The method includes performing, using the first data, a second simulation of the matter producing second data representing details for the first simulation, the second data distributed in the space domain using a grid where each cell has a common depth-to-size ratio from a camera perspective. The method includes rendering an image of the matter, wherein the second data is obtained from the grid and used in the rendering.

Implementations can include any or all of the following features. The depth-to-size ratio is determined by a depth of each cell and a height or width of each cell. The first data includes a vector field for the matter in the space domain and at least one scalar field for the matter in the space domain; and the second data includes at least one detail scalar field representing the details. The vector field represents velocities of the matter in the space domain; and the scalar field and the detail scalar field represent at least one physical characteristic of the matter. First and second scalar fields in the first data represent a temperature and a density, respectively, of the matter in the first simulation; and first and second detail scalar fields in the second data represent a temperature and a density, respectively, of the matter in the second simulation. The matter includes a fluid; the first simulation corresponds to a first fluid movement that is globally coupled in the space domain; and the second simulation corresponds to a second fluid movement that is not globally coupled in the space domain. The space domain has a first resolution for the first simulation that is visually of a low frequency, the first simulation representing a low frequency fluid motion; and the space domain has a second resolution for the second simulation that is visually of a high frequency, the second resolution higher than the first resolution, the second simulation representing spatially independent high frequencies to the low frequency fluid motion. The grid is a perspective grid based on three dimensional cells arranged in a frustum space. The three dimensional cells are shaped so that: heights of all the cells in the frustum space are equal with regard to a camera viewing the space domain from the camera perspective; and widths of all the cells in the frustum space are equal with regard to the camera. The second simulation is performed at a higher resolution in the space domain than the first simulation: and the second simulation is performed only for a subset of the cells in the grid. The grid includes a first plurality of cells in the first simulation, each cell being configured to assume any of at least an on state and an off state; only a second plurality selected from the first plurality of cells as being in the on state are included in the second simulation; and each of the cells in the second plurality of cells includes a further subdivision not present in a remainder of the first plurality of cells, the further subdivision providing the higher resolution of the second simulation.

In a second aspect, a computer program product is tangibly embodied in a computer-readable storage medium and includes instructions that when executed by a processor perform a method for applying details in a simulation. The method includes obtaining first data corresponding to a first simulation of matter in a space domain. The method includes performing, using the first data, a second simulation of the matter producing second data representing details for the first simulation, the second data distributed in the space domain using a grid where each cell has a common depth-to-size ratio from a camera perspective. The method includes rendering an image of the matter, wherein the second data is obtained from the grid and used in the rendering.

In a third aspect, a system includes at least one simulator tangibly implemented in a computer readable storage device, the simulator configured to: perform a first simulation of matter in a space domain, the first simulation producing first data; and perform a second simulation of the matter using the first data, the second simulation producing second data representing details for the first simulation, the second data distributed in the space domain using a grid where each cell has a common depth-to-size ratio from a camera perspective. The system includes a renderer tangibly implemented in a computer readable storage device, the renderer configured to render an image of the matter, wherein renderer obtains the second data from the grid for use in the rendering.

Implementations can include any or all of the following features. The depth-to-size ratio is determined by a depth of each cell and a height or width of each cell. The first data includes a vector field for the matter in the space domain and at least one scalar field for the matter in the space domain; and the second data includes at least one detail scalar field representing the details. The vector field represents velocities of the matter in the space domain; and the scalar field and the detail scalar field represent at least one physical characteristic of the matter. First and second scalar fields in the first data represent a temperature and a density, respectively, of the matter in the first simulation; and first and second detail scalar fields in the second data represent a temperature and a density, respectively, of the matter in the second simulation.

Implementations can include any or all of the following features. The space domain has a first resolution for the first simulation that is visually of a low frequency, the first simulation representing a low frequency fluid motion; and the space domain has a second resolution for the second simulation that is visually of a high frequency, the second resolution higher than the first resolution, the second simulation representing spatially independent high frequencies to the low frequency fluid motion. The grid is a perspective grid based on three dimensional cells arranged in a frustum space. The three dimensional cells are shaped so that: heights of all the cells in the frustum space are equal with regard to a camera viewing the space domain from the camera perspective; and widths of all the cells in the frustum space are equal with regard to the camera. The second simulation is performed at a higher resolution in the space domain than the first simulation: and the second simulation is performed only for a subset of the cells in the grid. The grid includes a first plurality of cells in the first simulation, each cell being configured to assume any of at least an on state and an off state; only a second plurality selected from the first plurality of cells as being in the on state are included in the second simulation; and each of the cells in the second plurality of cells includes a further subdivision not present in a remainder of the first plurality of cells, the further subdivision providing the higher resolution of the second simulation.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
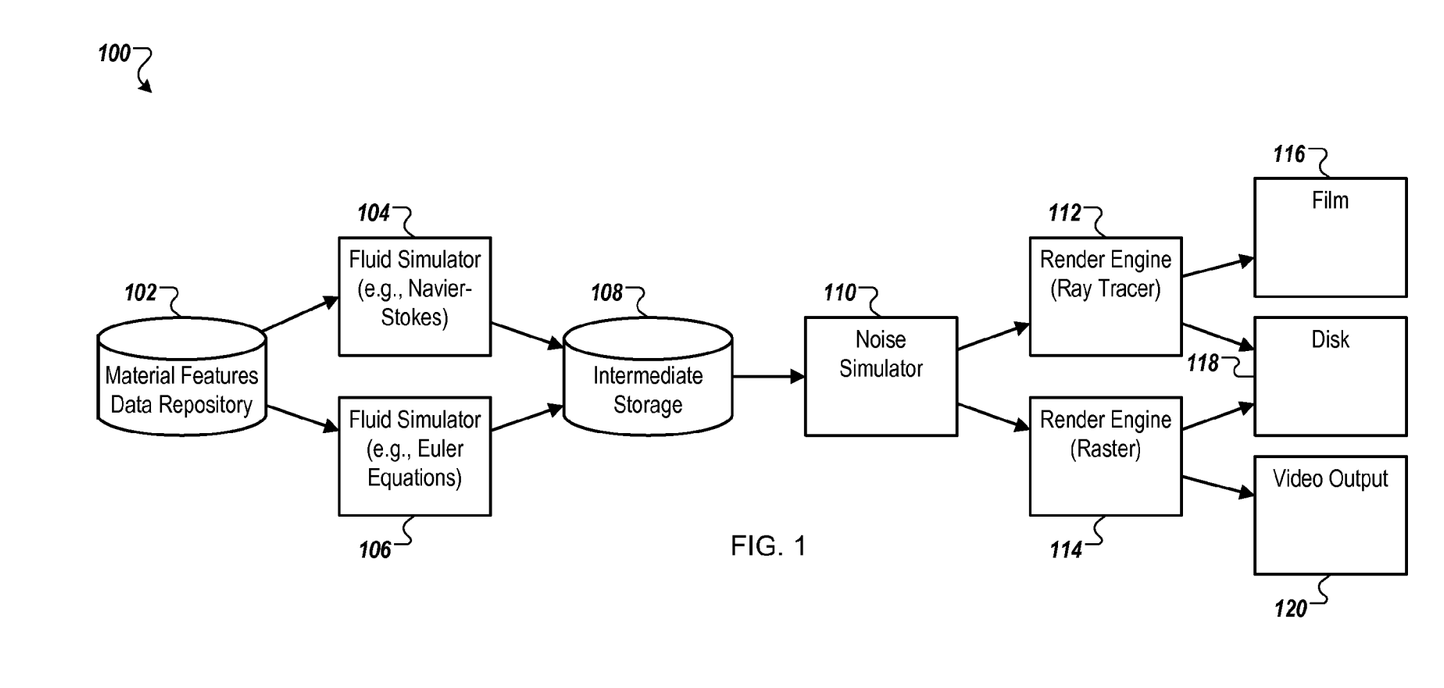
FIG. 1 is a block diagram of an example computer system that can generate and render fluid models.

FIG. 1 is a block diagram of an example computer system 100 that can generate and render fluid models. In some implementations, the computer system 100 generates a three dimensional model of a fluid, applies high resolution detail to the model, and renders the model into a two dimensional image. For example, such high-resolution detail can be selectively distributed using a perspective grid in the model. The computer system 100 can be used to make frames of a video, such as for a cinematic movie or live videogame output, to name just a few examples.

A material features data repository 102 can store data defining fluid behavior for use in one or more fluid simulations. In some examples, the data in the materials features data repository 102 includes vector and scalar features used to define parameters of a fluid that can affect the visual appearance of the fluid. For example, a smoke fluid can be based on vector values for airflow and scalar values for temperature and density.

A fluid simulator 104 and/or 106 can receive data defining fluid behavior. In some implementations, the fluid simulator 104 and/or 106 can generate a three dimensional model of the fluid, the model including at least one vector field and at least one scalar field. In some examples, the fluid simulators 104 and/or 106 can receive additional data, such as a three dimensional model defining an environment in which the fluid is modeled. In some examples, the fluid simulator 104 can be configured to solve fluid motion using the same or different calculations as the fluid simulator 106. For example, the fluid simulator 104 can use the Navier-Stokes method of solving globally coupled fluid motion, and the fluid simulator 106 can use the incompressible Euler equations method of solving globally coupled fluid motion. Other simulation methods can be used. The system 100 can include one or more simulators, e.g., the simulator 104 and/or 106.

In some implementations, a three dimensional model created by the fluid simulator 104 and/or 106 can be stored in an intermediate storage 108. The three dimensional model can be defined with reference to any of multiple space domains capable of representing at least three dimensions, for example a Cartesian world space domain. In some examples, the fluid model can be accessed to solve an engineering problem or used in motion picture rough cuts. The intermediate storage 108 can be based on one or more computer readable media.

The fluid model can be used by a noise simulator 110 to create a high frequency fluid model. The noise simulator can increase the detail level of the original fluid model by applying noise to the vector and/or scalar fields of the fluid model. For example, the fluid model can be treated as non-globally-coupled. In some examples, the noise applied to the fluid model can be of a higher frequency than the fluid model. In other implementations, another simulator can be used to generate detail data at a higher resolution than the earlier simulation.

The fluid model can be rendered by a render engine 112 and/or 114. The render engines 112 and/or 114 can perform volume rendering functions to create a two dimensional image from the three dimensional fluid model. In some examples, the render engine 112 can perform ray tracing volume rendering and/or the render engine 114 can perform raster volume rendering. The render engine 112 and/or 114 can store two dimensional images to a film 116, a disk 118, live video output 120, and/or other output media. The system 100 can include one or more render engines, e.g., the render engine 112 and/or 114.

The fluid model can be incremented by the fluid simulator 104 and/or 106, such as to represent points in time. In some implementations, such incrementing can be performed when generating individual video frames. For example, a model for a video to be shown at sixty frames per second can by incremented by one sixtieth of a second.

Figure 2:
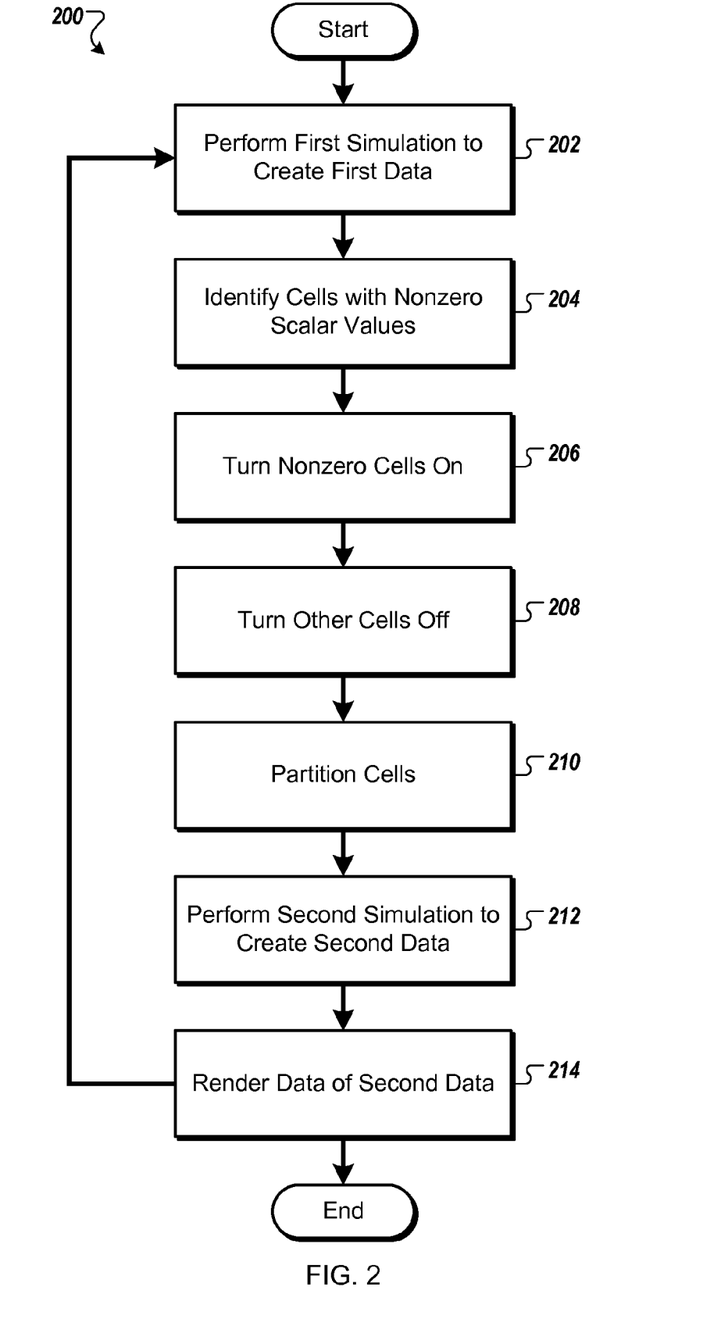
FIG. 2 is a flowchart of an example process for rendering generating a fluid model.

FIG. 2 is a flowchart of an example process 200 for generating and rendering a fluid model. In some implementations, the process 200 can be used to generate a first fluid model, identify areas of the model to be displayed, generate high frequency details based on the first fluid model to create a second fluid model, and display the second fluid model.

A first simulation can be performed to create first data (202). In some implementations, a globally coupled fluid model can be solved to create scalar and vector fields that represent physical properties of the model, such as temperature, color, density, velocity, and state of matter. For example, the fluid simulator 104 and/or 106 can generate a relatively low-resolution simulation of a fluid, such as the expansion of gas in a simulated explosion.

The environment containing the model can be partitioned into a perspective grid, for example a frustum-shaped three dimensional grid. Some of the cells can be identified as containing nonzero scalar values (204), and these cells can be assigned a value such as 'on' (206). Other cells can be assigned a value 'off' (208). In some implementations, either 'on' or 'off' can be a default value that is initially applied to all cells, and only the applicable one of steps 206 and 208 need then be performed.

Cells containing portions of the model, such as those assigned a value 'on,' can be partitioned (210) into subcells. In some implementations, the partitioning is performed automatically in all 'on' cells based on their status.

A second simulation can be performed to create second data (212). In some implementations, for each subcell, pseudo-random numbers within a predefined range can be added to the values of the scalar and/or vector fields to represent turbulence or noise. For example, the noise simulator 110 can create the second data.

The second data can be rendered (214) into a two dimensional image. In some examples, a color can be determined for each point in the scalar and/or vector fields. For example, in a model of smoke, the value at a point in a scalar field representing density and a scalar field representing temperature can be collected. The two scalar values can be used as the input to a function that returns a color for each point, such as a red, green, blue color (RGB color) with an alpha level (e.g., transparency). The color values can be used with volume rendering techniques to create a two dimensional image.

One or more of the operations of the method 200 can be repeated, such as for each frame of a video. Although a particular number, order, and type of operations are shown, it will be understood that other numbers, orders, and types of operation are possible. For example, the operations 204-210 can represent optional optimization operations intended to prevent calculation for volume not containing the model.

Figure 3A:
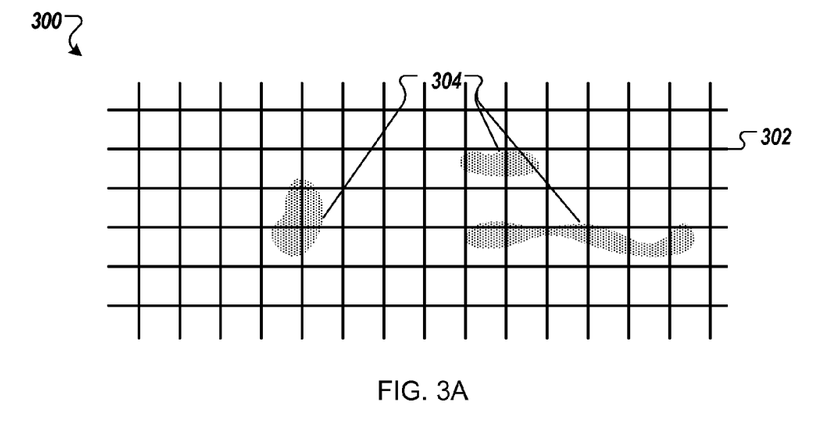
FIGS. 3A and B are block diagrams of an example fluid model.
Figure 3B:
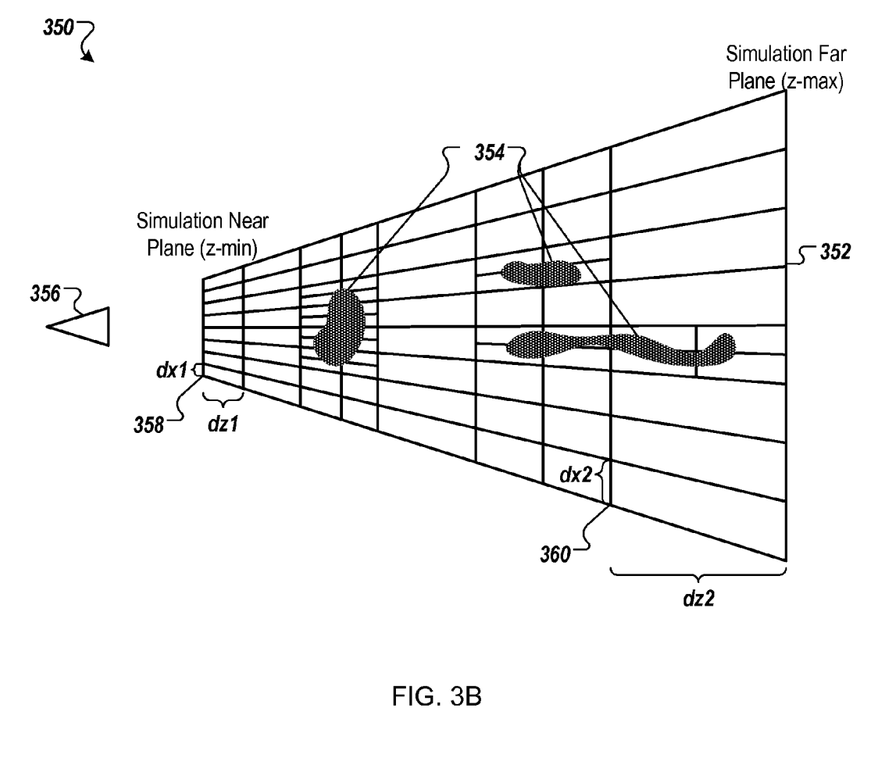

FIGS. 3A and B are block diagrams of an example fluid model. The fluid model can be used to determine the color and shape of a fluid in a virtual environment for rendering into a two dimensional shape. In some examples, the fluid model can generally include data of a relatively low frequency and, near a viewport, the fluid model can include data of a relatively high frequency, such as to provide visual detail.

In a first simulation, data 300, which can represent one or more fluids at a particular time, can be defined with regard to any space domain, for example a three dimensional Cartesian coordinate space, or can be defined using any other indexing method. A coordinate grid 302 here illustrates two of the dimensions of the Cartesian coordinate system, with the third dimension not visible. One or more simulation fluids 304 can be represented in the data 300 using at least a vector field and/or a scalar field. The vector and/or scalar fields can be used to solve for the fluids 304 at an arbitrary point in time. For example, if the state of the vector and/or scalar fields is known at a time $T_0$, the state of the vector and/or scalar fields at another time $T_1$ can be determined. The shape of one or more of the fluids 304 can then be different at the times $T_0$ and $T_1$.

In some examples, a vector field can represent a velocity of the fluids 304 and a scalar field can represent a physical property of the fluid, such as temperature, density, color, and/or state of matter. In some examples, the fluids 304 can be considered to be globally coupled. In some examples, the data 300 can be generated at a first resolution and can be used to represent fluid flow at the first resolution. Thus, the data 300 can be at a low resolution and represent low resolution fluid flow.

In a second simulation, data 350, which can represent fluids at a particular time, can be organized using a frustum coordinate space, or using another indexing and/or perspective indexing method. A coordinate grid 352 is shown to illustrate two of the three dimensions of the frustum coordinate space. Simulation fluids 354 are here represented in the data 350 by at least a vector field and/or a scalar field. In some examples, the vector field can represent the velocity of the fluids 354 and a scalar field can represent a physical property, such as temperature, density, color, and/or state of matter. The vector and/or scalar fields can be modified to add detail to the fluids 354, such as to improve the visual appearance of the fluids 354 when rendered. In some examples, the fluids 304 are used to create the fluids 354 at the same time state.

The frustum space in the data 350 can represent the area visible to a virtual camera 356 used, for example, in rendering the data 350 into a two dimensional image. In some examples, the frustum space is perspective space. The frustum space can be configured to place more high-resolution detail near the camera, where it matters more to a viewer. For example, the ratio of height or width to depth of each cell in the frustum space can be constant. Here, a height of each cell as seen by the camera is defined using an x-axis, and a depth of each cell as seen by the camera is defined using a z-axis. The width of each cell as seen by the camera is not visible in FIG. 3B, but can be defined using a y-axis in analogy with the x-axis. Here, for a cell 358 near the virtual camera 356 and a cell 360 farther from the virtual camera, the height to depth ratio of the cell 358 (dx1:dz1) and that of the cell 360 (dx2:dz2) can be equal (dx1:dz1=dx2:dz2). In such examples, the cells near the camera have the same height to depth ratio as all other cells, and have a smaller volume than the cells farther away from the camera. In the frustum space, high level simulation data for a cell near the camera is applied to a smaller region of the model than other high level simulation data for a cell far from the camera.

In some examples, the cells of the coordinate grid 352 can be subdivided or partitioned. For example, cells not containing the fluids 354 can be turned 'off' indicating that the empty cells can be ignored for the second simulation. Cells containing the fluids 354 can be turned 'on' and subdivided into subcells for use in the second simulation.

A random value (e.g., noise or turbulence) can be applied to the vector and/or scalar fields of the fluids 354 in one or more subcells. For example, such data can be applied to each subcell, or to each cell that is turned 'on,' or to each cell of the coordinate grid 352. In some implementations, the fluids 354 can be treated as non-globally-coupled, such that noise applied to one point of the fluids 354 does not necessarily affect the data at any remote points in the fluids 354. In some examples, each cell can have the same amount of noise data applied and, in some examples such as where each cell's height to width ratio is constant, noise data per volume density is greater closer to the camera than farther. In some examples, the data 350 can be at a higher resolution and represent higher resolution fluid flow than the resolution of the data 300.

Figure 4:
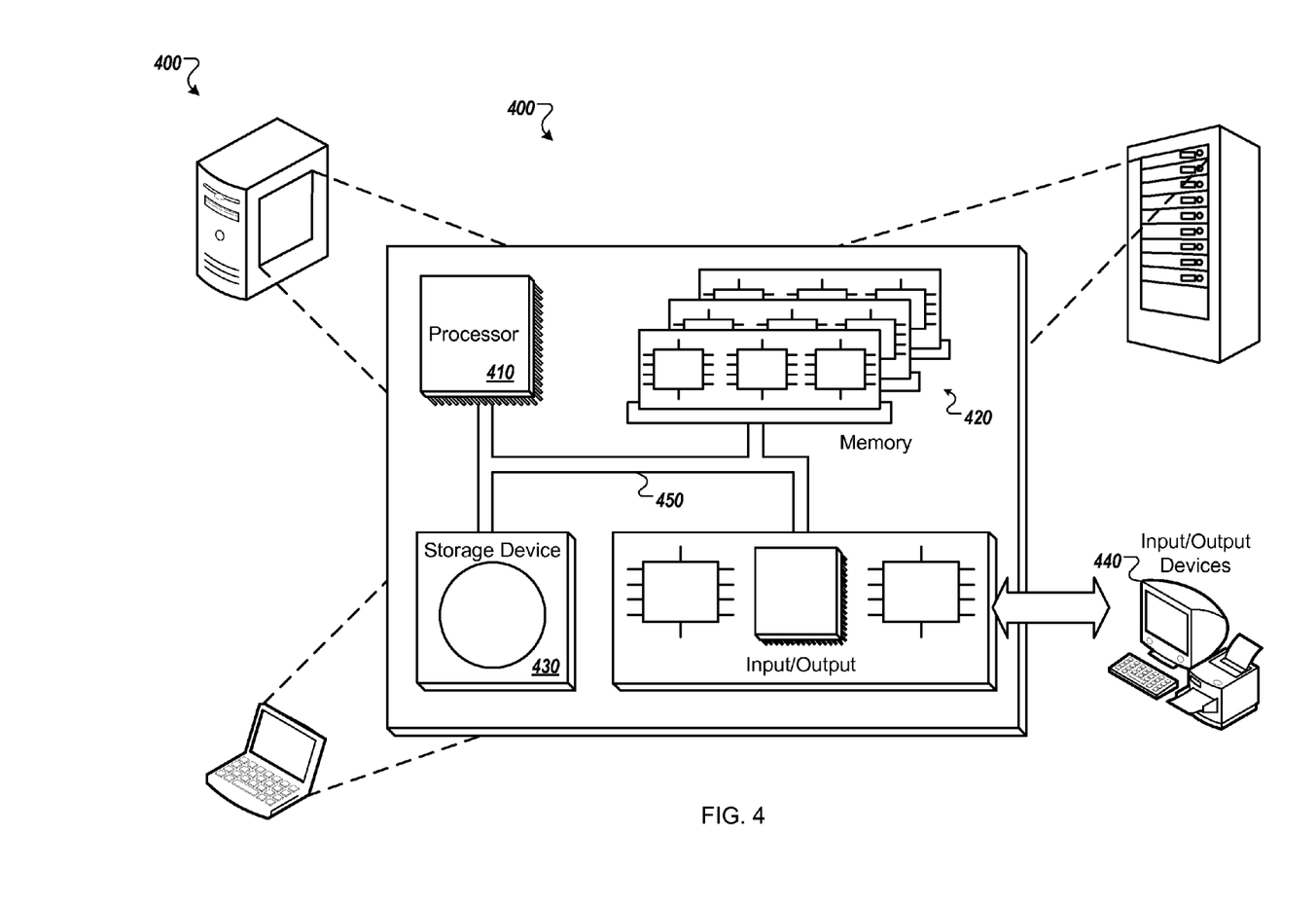
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for applying details in a simulation, the method comprising:
    receiving a three-dimensional (3D) model associated with a 3D space domain, the 3D model comprising a grid of 3D cells that subdivide the 3D space domain, wherein the 3D space domain is shaped as a frustum having flat parallel planes orthogonal to a camera perspective and has a common depth-to-size ratio from the camera perspective;
    obtaining first data corresponding to a first simulation of fluid matter in the 3D space domain, wherein the first simulation was performed using the 3D model;
    selecting a subset of 3D cells of the grid in which to perform a second simulation of the fluid matter;
    subdividing each 3D cell of the selected subset of 3D cells;
    performing, using the first data, a second simulation of the fluid matter in the subdivided 3D cells and producing second data comprising higher resolution information than the first simulation, and the second data is distributed in the subdivided 3D cells; and
    rendering an image of the fluid matter, wherein the second data is obtained from the subdivided 3D cells and is used in the rendering.

2. The computer-implemented method of claim 1, wherein the depth-to-size ratio is determined by a depth of each 3D cell and a height or width of each 3D cell.

3. The computer-implemented method of claim 1, wherein:
    the first data includes a vector field for the fluid matter in the 3D space domain and at least one scalar field for the fluid matter in the 3D space domain; and
    the higher resolution information includes at least one detail scalar field.

4. The computer-implemented method of claim 3, wherein:
    the vector field represents velocities of the fluid matter in the 3D space domain; and
    the scalar field and the detail scalar field represent at least one physical characteristic of the fluid matter.

5. The computer-implemented method of claim 4, wherein:
    first and second scalar fields in the first data represent a temperature and a density, respectively, of the fluid matter in the first simulation; and
    first and second detail scalar fields in the second data represent a temperature and a density, respectively, of the fluid matter in the second simulation.

6. The computer-implemented method of claim 1, wherein:
    the first simulation corresponds to a first fluid movement that is globally coupled in the space domain; and
    the second simulation corresponds to a second fluid movement that is not globally coupled in the space domain.

7. The computer-implemented method of claim 1, wherein the 3D cells are shaped so that:
    heights of all the 3D cells are equal with regard to a camera viewing the 3D space domain from the camera perspective; and
    widths of all the 3D cells are equal with regard to the camera.

8. The computer-implemented method of claim 1, wherein:
    the second simulation is performed at a higher resolution than the first simulation; and the second simulation is performed only in the subdivided 3D cells.

9. The computer-implemented method of claim 8, wherein:
in the first simulation, each 3D cell of the grid is configured to assume any of at least an on state and an off state;
only 3D cells being in the on state are selected to be subdivided to produce subdivided 3D cells in which to perform the second simulation.

10. A computer program product embodied in a non-transitory computer-readable storage medium and comprising instructions that when executed by a processor perform a method for applying details in a simulation, the method comprising:
receiving a three-dimensional (3D) model associated with a 3D space domain, the 3D model comprising a grid of 3D cells that subdivide the 3D space domain, wherein the 3D space domain is shaped as a frustum having flat parallel planes orthogonal to a camera perspective, and has a common depth-to-size ratio from the camera perspective;
obtaining first data corresponding to a first simulation of fluid matter in the 3D space domain, wherein the first simulation was performed using the 3D model;
selecting a subset of 3D cells of the grid in which to perform a second simulation of the fluid matter;
subdividing each 3D cell of the selected subset of 3D cells;
performing, using the first data, a second simulation of the fluid matter in the subdivided 3D cells and producing second data comprising higher resolution information than the first simulation, and the second data is distributed in the subdivided 3D cells; and
rendering an image of the fluid matter, wherein the second data is obtained from the subdivided 3D cells and is used in the rendering.

11. A system comprising:
one or more processors;
a non-transitory computer-readable medium having stored therein instructions that when executed by the one or more processors generate at least one simulator configured to:
perform a first simulation of fluid matter in a space domain, the first simulation producing first data, wherein the first simulation is performed using a three-dimensional (3D) model associated with a 3D space domain, the 3D model comprising a grid of 3D cells that subdivide the 3D space domain, wherein the 3D space domain is shaped as a frustum having flat parallel planes orthogonal to a camera perspective and has a common depth-to-size ratio from the camera perspective;
select a subset of 3D cells of the grid in which to perform a second simulation of the fluid matter;
subdivide each 3D cell of the selected subset of 3D cells;
perform the second simulation of the fluid matter in the subdivided 3D cells using the first data, the second simulation producing second data comprising higher resolution information than the first simulation, and the second data is distributed in the subdivided 3D cells; and
a non-transitory computer-readable medium having stored therein instructions that when executed by the one or more processors generate a renderer configured to render an image of the fluid matter, wherein the renderer obtains the second data from the subdivided 3D cells for use in the rendering.

12. The system of claim 11, wherein the depth-to-size ratio is determined by a depth of each 3D cell and a height or width of each 3D cell.

13. The system of claim 11, wherein:
the first data includes a vector field for the fluid matter in the 3D space domain and at least one scalar field for the fluid matter in the 3D space domain; and
the second data includes at least one detail scalar field representing the higher resolution information.

14. The system of claim 13, wherein:
the vector field represents velocities of the fluid matter in the 3D space domain; and
the scalar field and the detail scalar field represent at least one physical characteristic of the fluid matter.

15. The system of claim 14, wherein:
first and second scalar fields in the first data represent a temperature and a density, respectively, of the fluid matter in the first simulation; and
first and second detail scalar fields in the second data represent a temperature and a density, respectively, of the fluid matter in the second simulation.

16. The system of claim 11, wherein the 3D cells are shaped so that:
heights of all the 3D cells are equal with regard to a camera viewing the 3D space domain from the camera perspective; and
widths of all the 3D cells are equal with regard to the camera.

17. The system of claim 11, wherein
the second simulation is performed at a higher resolution than the first simulation; and
the second simulation is performed only in the subdivided 3D cells.

18. The system of claim 17, wherein:
in the first simulation, each 3D cell of the grid is configured to assume any of at least an on state and an off state;
only 3D cells of the grid being in the on state are selected to be subdivided to produce subdivided 3D cells in which to perform the second simulation.

19. The computer-implemented method of claim 1, wherein the second simulation applies random noise to the first data.

20. The system of claim 11, wherein the second simulation applies random noise to the first data.

21. The computer-implemented method of claim 1, wherein selecting a subset of 3D cells of the grid in which to perform a second simulation of the fluid matter consists of selecting cells that contain the fluid matter.

22. The system of claim 11, wherein the subset of 3D cells of the grid selected in which to perform a second simulation of the fluid matter consists of cells that contain the fluid matter.

* * * * *